United States Patent
Han et al.

(10) Patent No.: US 9,281,992 B2
(45) Date of Patent: Mar. 8, 2016

(54) METHOD AND SYSTEM FOR IDENTIFYING STORAGE DEVICE

(75) Inventors: Shengzhong Han, Shenzhen (CN); Aimin Lei, Shenzhen (CN); Liang Ji, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 131 days.

(21) Appl. No.: 14/113,894

(22) PCT Filed: Dec. 19, 2011

(86) PCT No.: PCT/CN2011/084243
§ 371 (c)(1),
(2), (4) Date: Oct. 25, 2013

(87) PCT Pub. No.: WO2012/146034
PCT Pub. Date: Nov. 1, 2012

(65) Prior Publication Data
US 2014/0052813 A1    Feb. 20, 2014

(30) Foreign Application Priority Data
Apr. 25, 2011  (CN) .......................... 2011 1 0103945

(51) Int. Cl.
*H04L 29/08* (2006.01)
*H04L 12/24* (2006.01)

(52) U.S. Cl.
CPC ...... *H04L 29/08549* (2013.01); *H04L 67/1097* (2013.01); *H04L 41/0853* (2013.01)

(58) Field of Classification Search
CPC .................. H04L 29/08549; H04L 41/0853; H04L 67/1097
USPC ......................................................... 709/214
See application file for complete search history.

(56) References Cited

U.S. PATENT DOCUMENTS 7,702,655 B1   4/2010  Panelli
7,886,031 B1   2/2011  Taylor et al.
(Continued)

FOREIGN PATENT DOCUMENTS

CN    1633131 A    6/2005
CN    1641658 A    7/2005
(Continued)

OTHER PUBLICATIONS

International Search Report in international application No. PCT/CN2011/084243, mailed on Mar. 22, 2012.
(Continued)

*Primary Examiner* — Kevin Bates
*Assistant Examiner* — Chen-Liang Huang
(74) *Attorney, Agent, or Firm* — Oppedahl Patent Law Firm LLC

(57) ABSTRACT

The disclosure provides a method for identifying a storage device, which includes: obtaining, by a master control server, disk information of a storage device through a storage server; determining, by the master control server, that there is a storage device matching a device identifier according to the disk information, and entering a monitoring state; otherwise, creating a device identifier for the storage device and entering the monitoring state. The disclosure also provides a system for identifying a storage device. Through the method and the system, the storage devices are uniformly identified so as to facilitate unified management of the storage devices.

11 Claims, 2 Drawing Sheets

(56) References Cited

U.S. PATENT DOCUMENTS

| | | | |
|---|---|---|---|
| 2002/0161596 A1* | 10/2002 | Johnson et al. ................... 705/1 |
| 2002/0174198 A1 | 11/2002 | Halter |
| 2003/0233270 A1 | 12/2003 | Buss |
| 2004/0088366 A1* | 5/2004 | McDougall et al. .......... 709/213 |
| 2010/0266131 A1 | 10/2010 | Cilfone |
| 2012/0069369 A1* | 3/2012 | Hagiwara .................... 358/1.13 |
| 2012/0254553 A1* | 10/2012 | Myrah et al. .................. 711/154 |
| 2014/0365657 A1 | 12/2014 | Cilfone |

FOREIGN PATENT DOCUMENTS

| | | |
|---|---|---|
| CN | 1653443 A | 8/2005 |
| CN | 1664793 A | 9/2005 |
| CN | 1694081 A | 11/2005 |
| CN | 101022363 A | 8/2007 |
| CN | 101197713 A | 6/2008 |
| CN | 101984399 A | 3/2011 |
| CN | 102202087 A | 9/2011 |
| CN | 101796514 B | 4/2012 |

OTHER PUBLICATIONS

English Translation of the Written Opinion of the International Search Authority in international application No. PCT/CN2011/084243, mailed on Mar. 22, 2012.

Supplementary European Search Report in European application No. 11864573.8, mailed on Jan. 22, 2015.

* cited by examiner

METHOD AND SYSTEM FOR IDENTIFYING STORAGE DEVICE

TECHNICAL FIELD

The disclosure relates to the field of distributed storage technology, in particular to a method and system for identifying a storage device.

BACKGROUND

In the storage model of current Network Attached Storage (NAS), a file system is built on several hard disks or several specific storage devices. In this case, the management of the storage device is relatively simple.

Generally, the storage device is managed by obtaining an identifier thereof. In the related art, the following methods are proposed for obtaining the identifier of the storage device.

1. For the storage device developed and researched in-house, some Erasable Programmable Logic Device (EPLD) registers are provided to store a version number and a material order number of a Printed Circuit Board (PCB) of the storage device. This kind of storage devices is uniquely indentified by the version number and the material order number of the PCB. However, the above manner is limited to the storage device developed and researched in-house, and the storage device from external procurement or produced by other manufacturers may not be provided with such information.

2. Corresponding to an Electro Magnetic Compatibility (EMC) magnetic-matrix device, a Universally Unique Identifier (UUID) of this kind of storage devices can be obtained through an Application Programming Interface (API). However, this manner is limited to the magnetic-matrix device or some brands of magnetic-matrix devices.

3. Other Just a Bunch Of Disks (JBOD) devices may have Intelligent Platform Management Interface (IPMI) to provide a product serial number. However, many devices do not have IPMI.

A file system in a distributed system of a cloud computing platform is built on heterogeneous storage architecture. Advantages of such design are that the file system may be adapted to various storage devices. Management of the heterogeneous storage device may allow a user to know operation of each storage device on each storage node, such as a device, a logical volume, a Redundant Array of Independent Disk (RAID), a disk and the like. Additionally, the upper layer may select different storage strategies according to the performance difference of respective storage devices. Obviously, the storage device with better function has more opportunity to be selected.

There is a problem with the current heterogeneous storage architecture, i.e., it is difficult to perform unified management of the storage devices. Since the heterogeneous storage architecture includes a plurality of kinds of storage devices, identifiers of respective storage devices are not unified, and it is impossible to obtain identifiers of storage devices through a unified method, so as to manage application programs and databases in a unified manner. Once the storage devices are powered down, fail or are migrated, the management of the storage devices will become more confusing.

SUMMARY

Accordingly, the main purpose of the disclosure is to provide a method and system for identifying a storage device, so as to uniformly identify storage devices and facilitate unified management of storage devices.

To resolve the above-mentioned technical problem, the disclosure provides a method for identifying a storage device, which includes:

obtaining, by a master control server, disk information of a storage device through a storage server;

determining, by the master control server, that there is a storage device matching a device identifier according to the disk information, and entering a monitoring state; and determining, by the master control server, that there is no storage device matching a device identifier according to the disk information, creating a device identifier for the storage device and entering the monitoring state.

The determining that there is a storage device matching a device identifier may include: comparing the received disk information of the storage device with disk information in an identifier table; determining that the storage device fully matches the device identifier in the identifier table when the disk information of the storage device fully matches the disk information in the identifier table; otherwise, determining that the storage device fuzzily matches the device identifier in the identifier table when a half or more of the disk information of the storage device matches the disk information in the identifier table.

The determining that the storage device fuzzily matches the device identifier in the identifier table may include: when one storage device fuzzily matches the device identifier in one identifier table, determining that the storage device fuzzily matches the device identifier in the identifier table; or, when each of a first storage device and a second storage device fuzzily matches the device identifier in one identifier table, determining that the first storage device fuzzily matches the device identifier in the identifier table, and a device identifier is assigned to the second storage device; or, when one storage device fuzzily matches the device identifiers in more than one identifier table, retaining and updating one identifier table, and deleting other identifier tables.

The creating a device identifier for the storage device may include: creating an identifier table; generating a device identifier; and storing the generated device identifier and the disk information of the storage device in the created identifier table.

The entering a monitoring state may include: periodically updating, by the storage server, locally-stored disk information of the storage device; periodically obtaining, by the master control server, the disk information of the storage device through the storage server; determining that a disk is removed according to the received disk information; and updating the identifier table.

A system for identifying a storage device includes a master control server and a storage server, wherein:

the master control server is configured to obtain disk information of a storage device through the storage server, to determine that there is a storage device matching a device identifier in an identifier table according to the disk information, and then to enter a monitoring state; and to determine that there is no storage device matching a device identifier in an identifier table according to the disk information, and then to create a device identifier for the storage device and enter the monitoring state; and the storage server is configured to obtain the disk information of the storage device, to store the disk information, and to send the disk information to the master control server.

The master control server may include a database module and a device managing module, wherein: the device managing module is configured to send the received disk information to the database module; and the database module is configured to compare the received disk information sent from the device managing module with disk information in the identifier table, to determine that the storage device fully matches the device identifier in the identifier table when the disk information of the storage device fully matches the disk information in the identifier table, and to determine that the storage device fuzzily matches the device identifier in the identifier table when a half or more of the disk information of the storage device matches the disk information in the identifier table.

The database module may be configured: when determining that one storage device fuzzily matches the device identifier in one identifier table, to determine that the storage device fuzzily matches the device identifier in the identifier table; or, when each of a first storage device and a second storage device fuzzily matches the device identifier in one identifier table, to determine that the first storage device fuzzily matches the device identifier in the identifier table, and to assign a device identifier to the second storage device; or, when one storage device fuzzily matches the device identifiers in more than one identifier table, to retain and update one identifier table, and to delete other identifier tables.

The database module may be configured, when determining that the storage device does not match the device identifier in the identifier table, to generate a device identifier, to create an identifier table, and to store the generated device identifier and the disk information of the storage device in the created identifier table.

The storage server may include a device management agent module and a device information querying module, wherein, the device managing module is configured, after successful power on, to periodically send a device information obtaining instruction to the device management agent module, and to send the received disk information of the storage device to the database module; the database module is configured to determine that a disk is removed according to the received disk information, and to update the identifier table; the device management agent module is configured to periodically update locally-stored disk information of the storage device through the device information querying module, and to receive the device information obtaining instruction sent by the device managing module, and to send the locally-stored disk information to the device managing module; and the device information querying module is configured to read the disk information of the storage device, and to send the read disk information to the device management agent module.

In view of the above, according to the above method and device, when the master control server determines that there is no identifier matching a storage device, it creates a device identifier for this storage device, so as to manage storage devices through unified identifier in the distributed storage system, and the above method and device are suitable for management of various kinds of storage devices.

Additionally, when entering the monitoring state, the master control server periodically updates an identifier table according to states of the storage devices, so that the relationship between the storage devices and the device identifiers stored in the master control server may be updated in time, so as to facilitate management of the storage devices.

DETAILED DESCRIPTION

The principle of the disclosure is that: a master control server obtains disk information of a storage device through a storage server, and determines whether there is a device identifier matches the storage device, if yes, the master control server enters a monitoring state; if no, the master control server creates a device identifier for the storage device and ensures uniqueness of the created identifier and correlation between the created identifier and the storage device, and then the master control server enters the monitoring state.

Hereinafter, embodiments of the disclosure will be described in detail with reference to the drawings.

Figure 1:
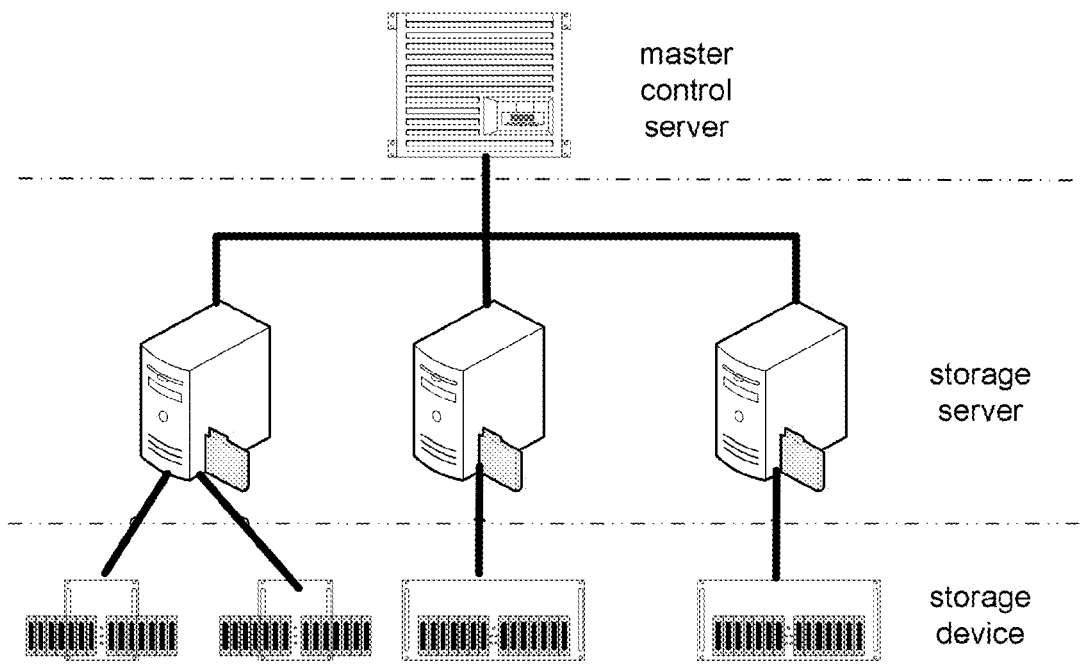
FIG. 1 is a diagram of a distributed storage system's base architecture.

To make the disclosure clearer, a distributed storage system's base architecture will be described briefly. As shown in FIG. 1, the distributed storage system is composed of a master control server, a storage server and a storage device. The storage device may be various kinds of storage devices. Data to be stored is stored by respective storage devices of which each is managed by a corresponding storage server. Each storage server is managed and scheduled uniformly by the master control server. Each storage device is registered on the master control server, and a database of the master control server obtains data of the storage device (such as a model number and performance characteristics) by registering to manage the storage device. Additionally, a corresponding storage strategy, i.e., a corresponding storage device, is selected according to the data of the storage device to store data.

Figure 2:
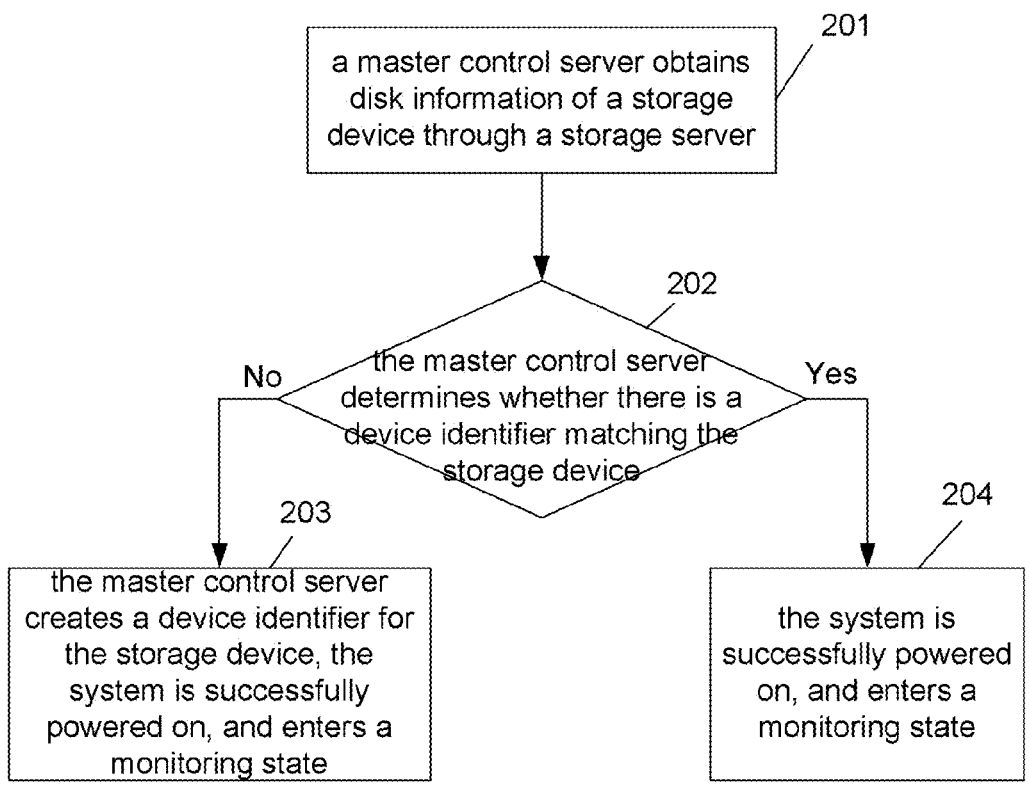
FIG. 2 is a flowchart of a method for identifying a storage device according to an embodiment of the disclosure.

FIG. 2 shows a method for identifying a storage device, which includes the following steps.

Step 201: a master control server obtains disk information of a storage device through a storage server.

After a distributed storage system (to facilitate description, hereinafter the distributed storage system is referred to as "the system") is powered on, the master control server thereof sends a device information obtaining instruction to each storage server. Each storage server receives the device information obtaining instruction and then reads a disk serial number of a disk in the storage device, i.e., reads the disk information. The disk is one part of the storage device and is used to store data. The storage device is composed of several disks. The storage server stores the read disk information of the storage device and then sends the read disk information to the master control server.

Step 202: the master control server determines whether there is a device identifier matching the storage device according to the disk information; if yes, proceed to step 204; if no, proceed to step 203.

The master control server receives the disk information of the storage device and queries an identifier table stored in a database thereof; if disk information in the identifier table fully matches the received disk information of the storage device, it means a device identifier in the identifier table fully matches the storage device, and the device identifier in the identifier table is the identifier of the storage device, then the method proceeds to step 204. The identifier table stores the relationship between the device identifier of the storage device and the disk information of the storage device. Each storage device is corresponding to one identifier table. The device identifier is generated by the master control server to identify the storage device. The generation of the device identifier may be implemented through any suitable matter, such as a random string together with a timestamp, as long as the generated identifier is uniform.

However, if some disks of the storage device are removed after the system is powered down, when the system is powered on the identifier relationship table matching the storage device will be not found. Therefore, the fuzzy matching principle is used in the disclosure, so that the master control server further determines whether at least a half or more of disk serial numbers (i.e., disk information) in the disk information of the storage device which only partly matches the storage device match the disk information in the identifier table; if yes, it means the storage device fuzzily matches the device identifier in the identifier table, and the device identifier in the identifier table is the identifier of the storage device, then the method proceeds to step 204. The process for determining the storage device fuzzily matches the device identifier in the identifier table includes the following circumstances.

The master control server determines that one storage device fuzzily matches a device identifier in one identifier table, then the method proceeds to step 204.

After the system is powered down, a half of disks of one storage device are removed and installed in other storage device, and thus when the system is powered on two storage device will fuzzily match the device identifier in one identifier table; if said one storage device, from which disks are removed, is referred to as a first storage device, and said storage device, in which disks are installed, is referred to as a second storage device, the first storage device retains the original identifier, i.e., the first storage device fuzzily matches the device identifier in one identifier table, and a device identifier is assigned to the second storage device, and then the method proceeds to step 204. The assignment of the device identifier includes: if all disk information of the second storage device belongs to the identifier table, it means the second storage device originally does not include other disk, and the second storage device is newly accessed in the system; a device identifier is generated for the second storage device, which includes that the master control server generates a device identifier and then the device identifier and the disk information form the identifier table; if none of disk information of the second storage device belongs to the identifier table, it means the second storage device is an original storage device in the system, the identifier table, in which all disk information matches the disk information of the second storage device, is found to update the identifier table, then the identifier of the second storage device fully matches the device identifier in the identifier table. The updating the identifier table includes: the disk information of the second storage device is compared with the disk information in the identifier table, and the disk information of the second storage device but not in the identifier table is added into the identifier table.

At least a half of disks of two or more storage devices are removed and installed in one storage device, so that the one storage device fuzzily matches the device identifier of one or more identifier table, then only one identifier table is retained and updated and others are deleted, and then the method proceeds to step 204. The updating is the same as the updating for the identifier table of the second storage when two storage devices fuzzily match the device identifier of one identifier table and the second storage device is the original storage device in the system, therefore, the detailed description is omitted.

If the device identifier in the identifier table does not match the storage device, the method proceeds to step 203.

Step 203: a device identifier is created for the storage device, the system is successfully powered on and enters a monitoring state.

The generation of the device identifier in step 203 is the same as the generation of the identifier when two storage devices fuzzily match the device identifier in one identifier table and the second storage device is newly accessed in the system, therefore, the detailed description is omitted.

Step 204: the system is successfully powered on and enters a monitoring state.

The entering a monitoring state includes: after the system is powered on, the storage server periodically updates locally-stored disk information of the storage device. The updating the disk information includes: the storage server periodically reads the disk information of the storage device and compares it with the locally-stored disk information of the storage device; if the two disk information is the same, no processing is needed; otherwise, a part of locally-stored disk information distinguishing from the disk information of the storage device is deleted, and a part of the disk information of the storage device distinguishing from the locally-stored disk information is added into locally-stored the disk information. The period may be set as desired.

The master control server periodically obtains the disk information of the storage device through the storage server, which includes: the master control server periodically sends a device information obtaining instruction to the storage server; the storage server receives the instruction and sends the locally-stored disk information of the storage device to the master control server; the master control server determines that some disks are removed according to the received disk information, and updates the identifier table. The period may be set as desired. The updating the identifier table includes: the master control server compares the received disk information with the locally-stored disk information in the identifier table; if there is disk information distinguishing from the locally-stored disk information in the identifier table, it means there is at least a disk is removed, then the distinguished disk information is deleted.

Figure 3:
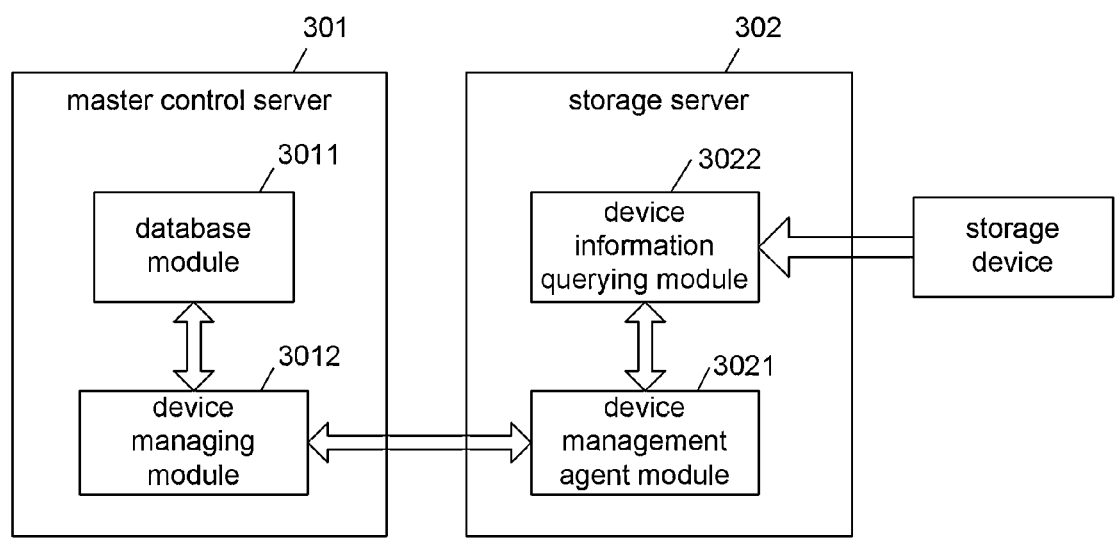
FIG. 3 is a diagram of a system for identifying a storage device according to an embodiment of the disclosure.

Based on the above method, the disclosure also provides a system for identifying a storage device, as shown in FIG. 3, the system includes a master control server 301 and a storage server 302.

The master control server 301 is configured, after the system is powered on, to obtain disk information of a storage device through the storage server 302, to determine that there is a storage device matching a device identifier, and then to enter a monitoring state, and to determine that there is no storage device matching an identifier table, and then to generate a device identifier for the storage device and enter a monitoring state.

The storage server 302 is configured to obtain the disk information of the storage device, to store the disk information, and to send the disk information to the master control server 301.

The master control server 301 includes a database module 3011 and a device managing module 3012.

The device managing module 3012 is configured to send the received disk information to the database module 3011, and to enter the monitoring state according to a notification from the database module 3011.

The database module 3011 is configured to compare the received disk information of the storage device with locally-stored disk information in the identifier table; if there is disk information of the storage device fully matching the disk information in the identifier table, to determine that the storage device fully matches the identifier table, and to inform the device managing module 3012 that the system is successfully powered on; if there is at least a half or more disk information of the storage device matching the disk information in the identifier table, to determine that the storage device fuzzily matches the identifier table, and to inform the device managing module 3012 that the system is successfully powered on; otherwise, to determine the storage device does not match the identifier table.

The database module 3011 is configured to determine that there is one storage device fuzzily matches the device identifier in one identifier table, and then to determine that the storage device fuzzily matches the device identifier in the identifier table; or, each of the first and second storage devices fuzzily matches the device identifier in one identifier table, and then to determine that the first storage device fuzzily matches the device identifier in the identifier table, and to assign a device identifier for the second storage device. The assigning for the device identifier includes: if all disk information of the second storage device belongs to the identifier table, it means the second storage device is newly accessed in the system, and a device identifier is created for the second storage device; if none of disk information of the second storage device belongs to the identifier table, it means the second storage device is an original storage device in the system, the identifier table, in which all disk information matches disk information of the second storage device, is found to update the identifier table, and then the second storage device fully matches the device identifier in the identifier table; or, one storage device matches device identifiers in more than one identifier table, one identifier table is retained and updated, and the others are deleted.

The database module 3011 is specifically configured to determine that the storage device does not match the device identifier in the identifier table, to generate a device identifier, to create an identifier table, to store the generated device identifier and the disk information of the storage device in the created identifier table, and to inform the device managing module 3012 that the system is successfully powered on.

The storage server 302 specifically includes a device management agent module 3021 and a device information querying module 3022.

The device management agent module 3021 is configured to receive a device information obtaining instruction sent by the device managing module 3012, and to call a query interface of the device information querying module 3022; and to store the received disk information of the storage device and send it to the device managing module 3012.

The device information querying module 3022 is configured to read the disk information of the storage device and return the disk information to the device management agent module 3021.

The device management agent module 3021 is specifically configured to periodically update locally-stored disk information of the storage device through the device information querying module 3022; to receive a device information obtaining instruction sent by the device managing module and send the locally-stored disk information to the device managing module. The updating the locally-stored disk information includes: the storage server periodically reads the disk information of the storage device, and compares it with the locally-stored disk information; if the two disk information is the same, no processing is needed; otherwise, the locally-stored disk information distinguishing from the disk information of the storage device is deleted, and the disk information of the storage device distinguishing from the locally-stored disk information is added into the locally-stored disk information. The period may be set as desired.

The device information querying module 3022 is configured to read the disk information of the storage device, and to return the disk information to the device management agent module 3021.

The device managing module 3012 is configured, after the system is successfully powered on, to periodically send the device information obtaining instruction to the device management agent module 3021; and to send the received disk information of the storage device to the database module 3011; in which the period may be set as desired.

The database module 3011 is configured to determine some disks are removed according to the received disk information, and to update the identifier table.

The mentioned above is only preferred embodiments of the disclosure but not limitation to the disclosure.

What is claimed is:

1. A method for identifying a storage device, wherein the storage device is in a distributed storage system based on heterogeneous storage architecture, and identifiers of various storage devices are different, comprising:
    obtaining, by a master control server, disk information of a storage device through a storage server;
    determining, by the master control server, that there is a storage device matching a device identifier according to the disk information, and entering a monitoring state; and
    determining, by the master control server, that there is no storage device matching a device identifier according to the disk information, creating a unique device identifier for the storage device randomly so that identifiers of various storage devices are unified and then various storage devices are managed through unified identifiers and entering the monitoring state;
    wherein the determining that there is a storage device matching a device identifier comprises:
    comparing the received disk information of the storage device with disk information in an identifier table;
    determining that the storage device fully matches the device identifier in the identifier table when the disk information of the storage device fully matches the disk information in the identifier table;
    otherwise, determining that the storage device fuzzily matches the device identifier in the identifier table when a half or more of the disk information of the storage device matches the disk information in the identifier table.

2. The method according to claim 1, wherein the determining that the storage device fuzzily matches the device identifier in the identifier table comprises:
    when one storage device fuzzily matches the device identifier in one identifier table, determining that the storage device fuzzily matches the device identifier in the identifier table; or
    when each of a first storage device and a second storage device fuzzily matches the device identifier in one identifier table, determining that the first storage device fuzzily matches the device identifier in the identifier table, and a device identifier is assigned to the second storage device; or
    when one storage device fuzzily matches the device identifiers in more than one identifier table, retaining and updating one identifier table, and deleting other identifier tables.

3. The method according to claim 1, wherein the creating a device identifier for the storage device comprises:
    creating an identifier table;
    generating a device identifier; and storing the generated device identifier and the disk information of the storage device in the created identifier table.

4. The method according to claim 1, wherein the entering a monitoring state comprises:
periodically updating, by the storage server, locally-stored disk information of the storage device;
periodically obtaining, by the master control server, the disk information of the storage device through the storage server;
determining that a disk is removed according to the received disk information; and
updating the identifier table.

5. A system for identifying a storage device, wherein the storage device is in a distributed storage system based on heterogeneous storage architecture, and identifiers of various storage devices are different, comprising a master control server and a storage server, wherein:
the master control server is configured to obtain disk information of a storage device through the storage server, to determine that there is a storage device matching a device identifier in an identifier table according to the disk information, and then to enter a monitoring state; and to determine that there is no storage device matching a device identifier in an identifier table according to the disk information, and then to create a unique device identifier for the storage device randomly so that identifiers of various storage devices are unified and then various storage devices are managed through unified identifiers and enter the monitoring state; and
the storage server is configured to obtain the disk information of the storage device, to store the disk information, and to send the disk information to the master control server;
wherein the master control server comprises a first processor and a second processor, wherein:
the second processor is configured to send the received disk information to the first processor; and
the first processor is configured to compare the received disk information sent from the second processor with disk information in the identifier table, to determine that the storage device fully matches the device identifier in the identifier table when the disk information of the storage device fully matches the disk information in the identifier table, and to determine that the storage device fuzzily matches the device identifier in the identifier table when a half or more of the disk information of the storage device matches the disk information in the identifier table.

6. The system according to claim 5, wherein the first processor is configured:
when determining that one storage device fuzzily matches the device identifier in one identifier table, to determine that the storage device fuzzily matches the device identifier in the identifier table; or
when each of a first storage device and a second storage device fuzzily matches the device identifier in one identifier table, to determine that the first storage device fuzzily matches the device identifier in the identifier table, and to assign a device identifier to the second storage device; or
when one storage device fuzzily matches the device identifiers in more than one identifier table, to retain and update one identifier table, and to delete other identifier tables.

7. The system according to claim 5, wherein the first processor is configured, when determining that the storage device does not match the device identifier in the identifier table, to generate a device identifier, to create an identifier table, and to store the generated device identifier and the disk information of the storage device in the created identifier table.

8. The method according to claim 2, wherein the creating a device identifier for the storage device comprises:
creating an identifier table;
generating a device identifier; and
storing the generated device identifier and the disk information of the storage device in the created identifier table.

9. The method according to claim 2, wherein the entering a monitoring state comprises:
periodically updating, by the storage server, locally-stored disk information of the storage device;
periodically obtaining, by the master control server, the disk information of the storage device through the storage server;
determining that a disk is removed according to the received disk information; and
updating the identifier table.

10. The system according to claim 6, wherein the storage server comprises a third processor and a fourth processor, wherein,
the second processor is configured, after successful power on, to periodically send a device information obtaining instruction to the third processor, and to send the received disk information of the storage device to the first processor;
the first processor is configured to determine that a disk is removed according to the received disk information, and to update the identifier table;
the third processor is configured to periodically update locally-stored disk information of the storage device through the fourth processor, and to receive the device information obtaining instruction sent by the second processor, and to send the locally-stored disk information to the second processor; and
the fourth processor is configured to read the disk information of the storage device, and to send the read disk information to the third processor.

11. The system according to claim 7, wherein the storage server comprises a third processor and a fourth processor, wherein,
the second processor is configured, after successful power on, to periodically send a device information obtaining instruction to the third processor, and to send the received disk information of the storage device to the first processor;
the first processor is configured to determine that a disk is removed according to the received disk information, and to update the identifier table;
the third processor is configured to periodically update locally-stored disk information of the storage device through the fourth processor, and to receive the device information obtaining instruction sent by the second processor, and to send the locally-stored disk information to the second processor; and
the fourth processor is configured to read the disk information of the storage device, and to send the read disk information to the third processor.

* * * * *